No. 842,648. PATENTED JAN. 29, 1907.
E. R. GORDON & D. R. THROOP.
PLATFORM LEVELING DEVICE FOR HARVESTERS.
APPLICATION FILED AUG. 4, 1906.
3 SHEETS—SHEET 1.
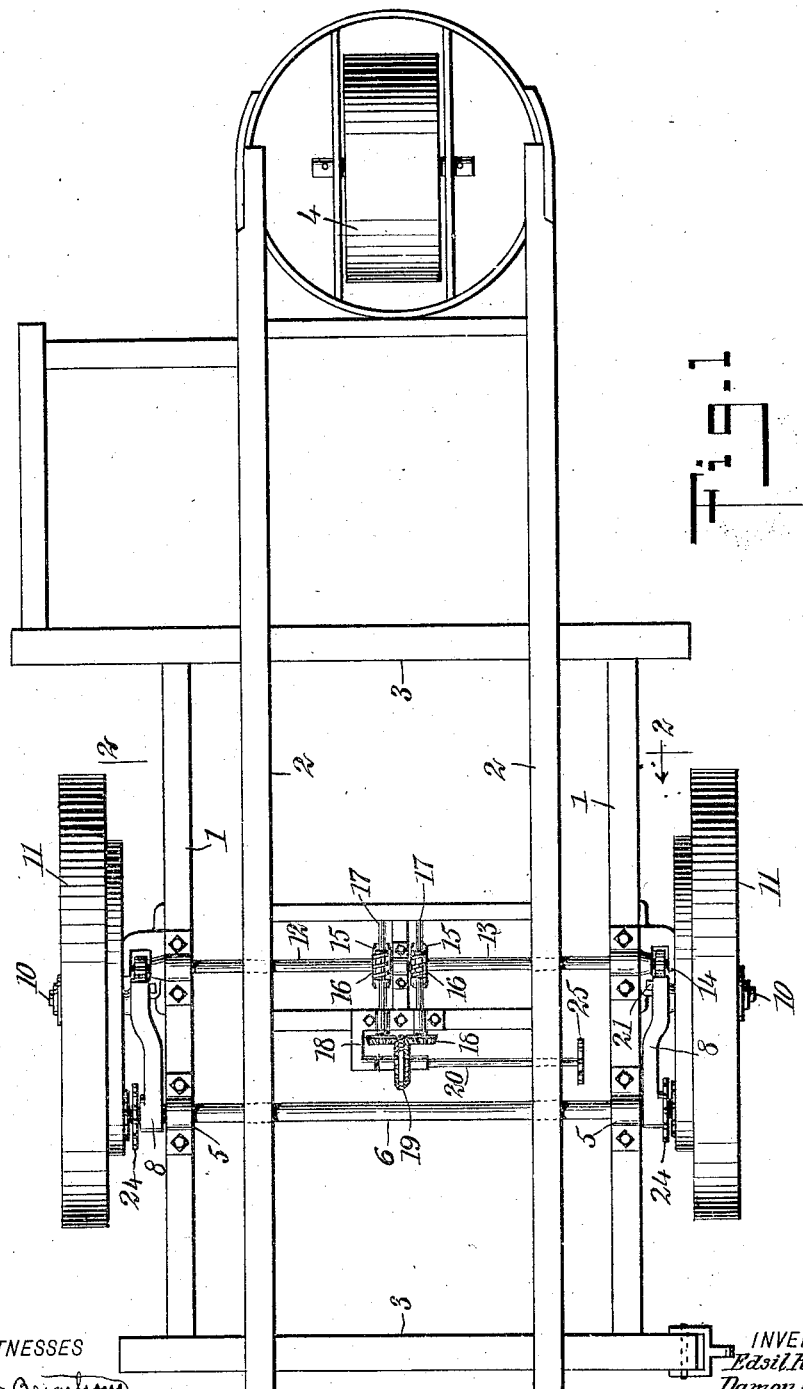
WITNESSES
INVENTORS
Edsil R. Gordon
Damon R. Throop
BY
ATTORNEYS No. 842,648. PATENTED JAN. 29, 1907.
E. R. GORDON & D. R. THROOP.
PLATFORM LEVELING DEVICE FOR HARVESTERS.
APPLICATION FILED AUG. 4, 1906.
3 SHEETS—SHEET 2.
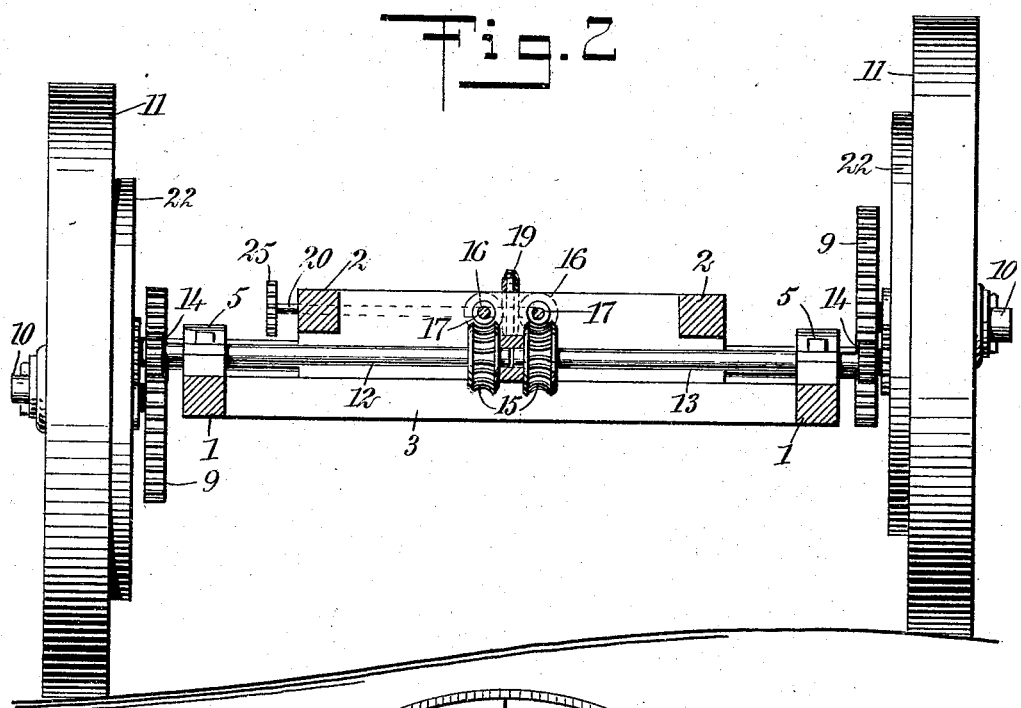
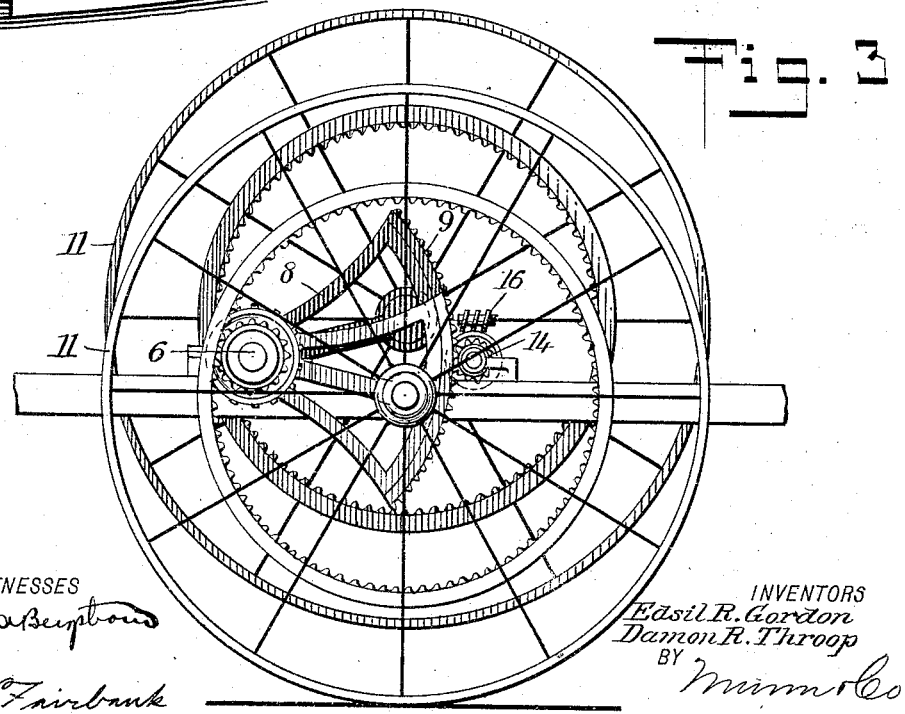
WITNESSES
INVENTORS
Edsil R. Gordon
Damon R. Throop
BY
ATTORNEYS

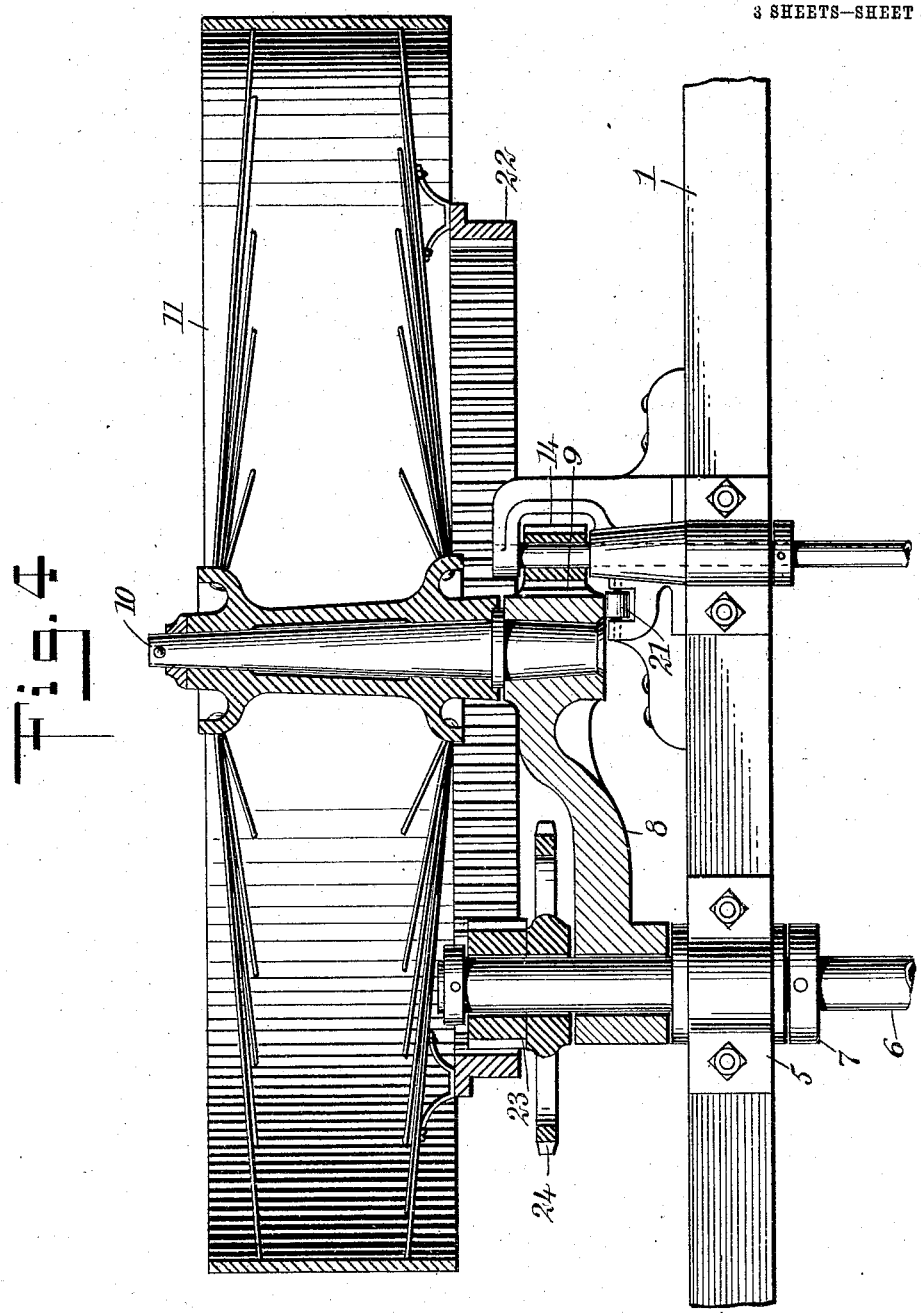

UNITED STATES PATENT OFFICE.

EDSIL R. GORDON AND DAMON R. THROOP, OF HARRINGTON, WASHINGTON, ASSIGNORS TO GORDON-THROOP-WOLFE COMPANY, OF HARRINGTON, WASHINGTON, A CORPORATION.

PLATFORM-LEVELING DEVICE FOR HARVESTERS.

No. 842,648.  Specification of Letters Patent.  Patented Jan. 29, 1907.

Application filed August 4, 1906. Serial No. 329,254.

*To all whom it may concern:*

Be it known that we, EDSIL R. GORDON and DAMON R. THROOP, both citizens of the United States, and residents of Harrington, in the county of Lincoln and State of Washington, have invented a new and Improved Platform-Leveling Device for Harvesters, of which the following is a full, clear, and exact description.

This invention relates to a new and improved means for simultaneously raising and lowering the main wheels on the opposite side of a harvester, reaper, or other similar vehicle in order that the body of said vehicle may be maintained in a level position, irrespective of the inclination on a hill upon which said harvester may be used.

Reference is to be had to the accompanying drawings, forming a part of this specification, in which similar characters of reference indicate corresponding parts in all the figures, in which—

Figure 1 is a plan of a harvester-platform provided with our improved device. Fig. 2 is a vertical section on the line 2 2 of Fig. 1 in the direction indicated by the arrow. Fig. 3 is a side elevation of a portion thereof, and Fig. 4 is a horizontal section through one of the main wheels and its adjusting mechanism.

In the drawings we have shown only the framework of a vehicle, as it is to be understood that any suitable machinery may be carried by said platform. As shown, this frame comprises two side members 1 1, having two intermediate longitudinal members 2 2 and a plurality of cross-timbers 3 3. The two side members or sills 1 1 support the main wheels, while the longitudinal members 2 2 support a third wheel 4 at its front end. Supported in suitable journal-boxes 5 5 on the side members or sills 1 1 is a main shaft 6, held from longitudinal movement by a collar 7 and having bracket-arms 8 8, pivoted on the ends thereof. Each of these arms 8 8 has its outer end in the form of a rack-sector 9, and adjacent said outer end is provided a stub-shaft or spindle 10, rigidly secured thereto and extending parallel to the main shaft 6. Each of these spindles carries a main wheel 11 for supporting the main platform, and as said wheels are supported on the ends of the pivoted arms 8 it is evident that the spindles 10 and the wheels may be raised or lowered in respect to the platform.

For raising one wheel and lowering the other simultaneously to maintain the platform in a level position while traveling along the side of a hill we provide two auxiliary shafts 12 13, supported in alinement and having on their outer ends pinions 14, adapted to engage with the cogs of a respective rack-sector 9 on the ends of the pivoted arms 8 and having on their adjacent ends means for rotating said shafts in opposite directions. The adjacent ends of the two shafts 12 13 are provided with gear-wheels 15, each having a worm-wheel 16 in engagement therewith and supported on a short shaft 17, suitably mounted in the main framework. The two shafts 17 17 lie parallel and have gear-wheels 18 18 on their adjacent ends, both adapted to engage with a double bevel-gear-wheel 19, suitably mounted between the two. It will thus be noted that by the rotation of a shaft 20, supporting the said gear-wheel 19, the two gears 18 18, worm-wheels 16 16, and shafts 12 13 will be caused to simultaneously rotate in opposite directions, and one of the bracket-arms 8 will be raised, while the other of said bracket-arms will be lowered. For preventing the bracket-arms 8 8 from binding against the sides of the main frame as the said arms are raised or lowered we provide small antifriction-rollers 21, bearing against the bracket-arms adjacent their outer ends and facilitating the movement thereof.

The improved vehicle above described is preferably drawn by horses and carries machinery operated from the main wheels as the vehicle moves along. To provide means for transmitting the power, the main wheels are each provided with a large gear-wheel 22, adapted to mesh with a pinion 23, carried on each end of the shaft 6. As the bracket-arms which carry the main wheels are pivoted on this same shaft 6, the pinion 23 will always be equidistant from the center of the wheel 11 and will therefore continuously mesh with the gear-wheel 22. The shaft 6 may be provided with sprocket-wheels 24, whereby the power may be transmitted to the machinery carried on the main platform, although it is evident that any other suitable power-transmitting means—as, for instance, a pulley or gear-wheel—may be used.

Our improved device above described is very simple in its operation, as the two wheels are simultaneously adjusted in opposite directions by a single operation. The shaft 20 for accomplishing this may be rotated in any suitable manner—as, for instance, by a lever, pawl and ratchet, or by a chain and sprocket-wheel 25, connected to the upper part of the platform and within the reach of the person operating the machine.

Our improved platform-adjuster is especially adapted for use in connection with combined harvesters and threshers, although it is evident that it may be employed in connection with other agricultural implements, the successful operation of which depends upon their being maintained level even when operated upon hilly land.

Having thus described our invention, we claim as new and desire to secure by Letters Patent—

1. In combination, a main frame, arms pivoted at the sides of said frame, main wheels carried by said arms, means for simultaneously raising one of said arms and lowering the other, comprising two transverse shafts supported in alinement on the frame, gear-wheels on the adjacent ends of said shafts, worm-wheels in engagement with said gear-wheels and supporting auxiliary shafts, bevel-gears on the ends of said auxiliary shafts, a double bevel-gear in engagement with both of said gears, and means for rotating said double bevel-gear, whereby the transverse shafts are rotated in opposite directions.

2. In combination, a main frame, a shaft suitably mounted thereon, pinions on the ends of said shaft, sprocket-wheels adjacent said pinions, arms pivoted to said shaft, spindles carried on the ends of said arms, main wheels mounted on said spindles, a gear-wheel carried by each of said main wheels and adapted to mesh with the said pinions, brackets carried upon opposite sides of said main frame, two transverse shafts mounted in said brackets, pinions on the outer ends of said shafts and in engagement with the said arms, antifriction-rollers carried by said brackets and in engagement with said arms, and means for rotating said transverse shafts in opposite directions, whereby one of said arms may be raised and the other lowered.

3. In combination, a main frame, a main shaft carried thereby, arms pivoted to the ends of said shaft, spindles carried by said arms, main wheels on said spindles, means for transmitting the power from said main wheels to said shaft, and means for simultaneously raising one of said arms and lowering the other in respect to the frame, said means comprising rack-bars on the ends of the arms, brackets carried by the frame, two transverse shafts mounted in alinement within said brackets and terminating adjacent said rack-bars, pinions on the end of said shafts and adapted to engage with the rack-bars, antifriction-rollers carried by said brackets and adapted to engage with the sides of said rack-bars, and means for simultaneously rotating said transverse shafts in opposite directions.

4. In combination, a main frame, a main shaft mounted thereon, an arm pivoted on said main shaft, a spindle carried by said arm, a main wheel upon said spindle, means carried by said main wheel and said main shaft, whereby power may be transmitted to the latter, a rack-bar on the outer end of said arm, a bracket carried by the main frame, a transverse shaft mounted within said bracket a pinion mounted on said transverse shaft and adapted to engage with the rack-bar, and a roller mounted upon said bracket adjacent said pinion and adapted to engage with said arm adjacent the rack-bar.

5. In combination, a main frame, arms pivoted at the sides of said frame, main wheels carried by said arms, means for simultaneously raising one of said arms and lowering the other, comprising two transverse shafts supported in alinement on the frame, pinions on the outer ends of said shafts and adapted to engage with said arms, gear-wheels on the inner ends of said shafts, parallel auxiliary shafts having worm-wheels in engagement with said gear-wheels, and means for rotating said auxiliary shafts in opposite directions.

In testimony whereof we have signed our names to this specification in the presence of two subscribing witnesses.

EDSIL R. GORDON.
DAMON R. THROOP.

Witnesses:
A. N. GREEN,
LLOYD LIGHTHIZER.